(12) United States Patent
Winkler et al.

(10) Patent No.: US 6,365,079 B1
(45) Date of Patent: Apr. 2, 2002

(54) PROCESS FOR PREPARING STARCH AND EPOXY-BASED THERMOPLASTIC POLYMER COMPOSITIONS

(75) Inventors: Marie S. Winkler, Lake Jackson; Tricia S. Berry, Austin; Donald E. Kirkpatrick, Lake Jackson, all of TX (US)

(73) Assignee: Dow Chemical Company, Midland, MI (US)

(*) Notice: Subject to any disclaimer, the term of this patent is extended or adjusted under 35 U.S.C. 154(b) by 0 days.

(21) Appl. No.: 09/569,497

(22) Filed: May 11, 2000

Related U.S. Application Data

(60) Provisional application No. 60/134,269, filed on May 14, 1999.

(51) Int. Cl.$^7$ ................................................ B02C 13/02
(52) U.S. Cl. ..................... 264/143; 524/47; 264/211; 264/211.21; 264/211.22; 264/211.23
(58) Field of Search ........................... 524/47; 264/211, 264/211.21, 211.22, 211.23, 143

(56) References Cited

U.S. PATENT DOCUMENTS 5,852,078 A * 12/1998 Willett et al. .................. 524/35

OTHER PUBLICATIONS

"Polysaccharides", vol. 13, pp. 87–144.

"Second Edition, Encyclopedia of Polymer Science and Engineering", vol. 3, Cellular Materials to Composites, pp. 90–119.

"Second Edition, Encyclopedia of Polymer Science and Engineering", vol. 3, Cellular Materials to Composites, pp. 226–263.

\* cited by examiner

*Primary Examiner*—James J. Seidleck
*Assistant Examiner*—U. K Rajguru

(57) ABSTRACT

A process for preparing a starch-based thermoplastic hydroxy-functionalized polyetheramine comprising continuously feeding from about 40 to about 98 weight percent starch and from about 2 to about 60 weight percent of a thermoplastic hydroxy-functionalized polyetheramine into a mixing screw extruder at a temperature of from about 30° C. to about 120° C. while maintaining a water content in the extruder of from about 7 to about 50 percent, continuously removing the compounded mixture from the extruder in the form of strands at a rate of from 13.5 to 2725 kg/hour, and forming the strands of compounded mixture into pellets.

10 Claims, No Drawings

PROCESS FOR PREPARING STARCH AND EPOXY-BASED THERMOPLASTIC POLYMER COMPOSITIONS

This application claims the benefit of U.S. Provisional Application No. 60/134,269, filed May 14, 1999.

BACKGROUND OF THE INVENTION

This invention relates to a process for preparing starched-based thermoplastic polymer compositions and the compositions prepared thereby.

U.S. Pat. No. 3,137,592 to Protzman describes a process which comprises mixing starch with about 22 percent to about 67 percent water based on the weight of the starch raw material dry substance. The starch may or may not be modified. The mixture of the starch and water is fed under pressure onto a rotating screw, advanced by means of the rotation of the screw while maintaining an increased temperature by means of external heaters and the shearing action of the screw. The material is mechanically worked in a confining chamber formed by the screw and barrel of the extruder and then transformed into a homogeneous viscous fluid mass.

U.S. Pat. No. 4,673,438 to Wittwer et al. describes a starch/water composition obtained by maintaining a starch/water composition at a water content of 5 percent to 30 percent by weight of the composition under controlled conditions of temperature and pressure, heating the starch/water composition under pressure above its glass transition temperature and melting point while maintaining said water content to form a melt and further heating and plasticizing the molten starch/water composition to dissolve the starch in the water to form a melt as a molecularly dispersed solution of said melt.

U.S. Pat. No. 4,454,268 to Otey describes a process for preparing a starch-based film from a composition of a blend of starch, water and one or more polymers. Otey teaches that the starch should be highly gelatinized, which means that all or substantially all of the starch granules are sufficiently swollen and disrupted, that they form a smooth viscous dispersion in water. The mixture is then processed at 105° C. to 110° C. at elevated pressures and extruded as a film.

Mercier, C., Effect of Extrusion-Cooking, *Die Starke* 29. Jahrg. 1977/Nr. 2 S.48–52 (Mercier) describes a process for extruding unmodified potato starch having a moisture content before extrusion of 23 percent by weight using a semi-industrial twin-screw extruder.

Randall et al., "Development of Starch Based Plastics—A Reexamination of Selected Polymer Systems in Historical Perspective," *Starch/Starke* 45 (1993) Nr. 8, S. 276–280, has argued that the concept of "destructurization" is just a new name for an old concept of "gelatinization" of starch that first originated in the food industry. The term "gelatinization" refers to the process of disruption of the granular structure of starch by heating a starch suspension at temperatures in the range of 50° C. to 80° C.

In order to produce a satisfactory extruded article, starch must be combined with other polymers, because extrusion of starch alone produces a brittle, water-sensitive article. U.S. Pat. No. 5,095,054 to Lay et al. describes the preparation of starch-based compositions comprising destructurized starch and water-insoluble polymers.

WO 97/23564 describes a composition comprising a polysaccharide, a modified polysaccharide, or a naturally-occurring fiber or particulate filler and a thermoplastic hydroxy-functional polyether derived from monomers containing 1 or more epoxy groups. The components are brought together and processed in an appropriate melt extruder from which the blend is extruded in the form of powder or strands. The powders or strands are then pelletized or formed into granules for injection molding and other thermal processes.

SUMMARY OF THE INVENTION

The present invention is a process for preparing a starch-based thermoplastic hydroxy-functionalized polyetheramine comprising continuously feeding from about 40 to about 98 weight percent starch and from about 2 to about 60 weight percent of a thermoplastic hydroxy-functionalized polyetheramine into a mixing screw extruder at a temperature of from about 30° C. to about 120° C. while maintaining a water content in the extruder of from about 7 to about 50 weight percent, continuously removing the compounded mixture from the extruder in the form of strands at a rate of from 13.5 to 2725 kg/hour, and forming the strands of compounded mixture into pellets.

The hydroxy-functionalized polyetheramine has been found to adhere strongly to starch. This adhesion, and the generally good physical properties of hydroxy-functionalized polyetheramine, allows for the preparation of hitherto unknown materials with useful physical properties.

The starch-based thermoplastic compositions of the present invention are suitable for use in fabricating molded, extruded or foamed articles, containers, films, film laminates, or coatings using conventional fabricating techniques such as extrusion, compression molding, injection molding, blow molding and similar fabrication techniques commonly used to produce such articles. Examples of such articles include films, foams, sheets, loose fill packaging material, pipes, rods, bags, boxes, meat trays, egg cartons, cups and plates, cutlery, and other disposable consumer items. The compositions of the present invention are also suitable for use as adhesives and encapsulating agents.

DETAILED DESCRIPTION OF THE INVENTION

Preferably, the hydroxy-functionalized polyetheramine employed in the practice of the present invention has repeating units represented by the formula:

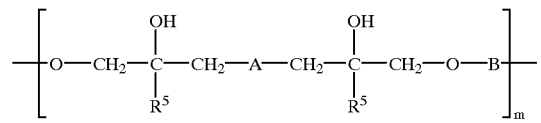

wherein $R^5$ is hydrogen or alkyl, A is an amine moiety or a combination of different amine moieties; B is a divalent organic moiety which is predominantly hydrocarbylene; and m is an integer from 10 to about 1000.

Preferably, A is 2-hydroxyethylimino-, 2-hydroxypropylimino-, piperazenyl, N,N'-bis(2-hydroxyethyl)-1,2-ethylenediimino-, and B is isopropylidenediphenylene, 1,3-phenylene, or 1,4-phenylene, and $R^5$ is hydrogen.

More preferably, the hydroxy-functionalized polyetheramine has repeating units represented by the formula:

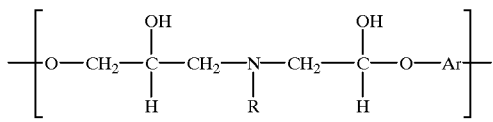

wherein R is 2-hydroxyethyl, phenyl, methyl, ethyl, propyl, 2-hydroxypropyl, 3-hydroxypropyl, cyclohexyl, butyl, aryl, hexyl or combination thereof; and Ar is isopropylidene, diphenylene, oxydiphenylene, sulfonyldiphenylene, methylene diphenylene, 1,4-phenylene, 1,3-phenylene or combination thereof.

The hydroxy-functionalized polyetheramines are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These polyetheramines are described in U.S. Pat. No. 5,275,853. These polyetheramines can also be prepared by contacting a diglycidyl ether or an epihalohydrin with a difunctional amine.

The term "starch" as used herein, refers to carbohydrates of natural, vegetable origin, composed mainly of amylose and/or amylopectin, and includes unmodified starches (native starches), physically modified starches, such as thermoplastic, gelatinized or cooked starches, starches with a modified acid value (pH) where acid has been added to lower the acid value of a starch to a range of from 3 to 6, gelatinized starches, ungelatinized starches, cross-linked starches and disrupted starches (starches which are not in particulate form). The starches can be in granular, particulate or powder form. They can be extracted from various plants, such as, for example, potatoes, tapioca, pea, and grains such as corn, rice, rye, oats and wheat.

The composition of the present invention may also contain various additives such as, for example, plasticizers, lubricants, pigments, foaming agents, extenders, stabilizers, chemical modifiers, and flow accelerators. Each of these additives is known and several types of each are commercially available.

While the amounts of hydroxy-functionalized polyetheramines (PHAE) and starch used depend on a variety of factors, including the specific polymer employed and the desired end uses of the composition, in general, the PHAE can be present in an amount of from about 2 to about 60 weight percent, and the starch can be present in an amount of from about 40 to about 98 weight percent. Preferably the PHAE can be present in an amount of from about 4 to about 40 weight percent, most preferably, from about 5 to about 30 weight percent. Preferably, the starch can be present in an amount of from about 60 to about 96 weight percent and, most preferably, from about 70 to about 95 weight percent. Generally, increasing the proportion of starch to PHAE tends to lower the cost, whereas decreasing the proportion of starch to PHAE tends to enhance the physical properties of the composition.

In general, the process for preparing the composition of the present invention comprises compounding the thermoplastic hydroxy-functionalized polyetheramine, starch and water and, optionally, other additives, such as those described previously. The compounding step can be done in a typical processing equipment including thermoplastic, rubber and food mixing equipment such as a single-screw extruder, twin-screw extruder, other multi-screw extruders, disk extruder, Haake mixer, a Banbury mixer, pellet cooker, injection-molding machine and the like, at a temperature and for a time sufficient to provide a compounded mixture of the components. Examples of single-screw extruders include a Wenger X-185, a Maddox extruder and a Davis Standard H Series. Examples of twin-screw extruders include a Wenger TX-185, a Farrel Continuous Mixer and a Werner Pfleiderer ZSK. Preferably, the components are brought together and processed in (1) a twin-screw extruder having a diameter of from 30 to 200 millimeters, a length to diameter ratio (L/D) of from 5:1 to 40:1, zone temperatures of from 30° C. to 120° C., an RPM of from 30 to 700, and output rates of from 13.5 to 2270 kg/hour or (2) a single-screw extruder having a diameter of from 114 to 330 millimeters, an L/D of from 4 to 40, zone temperatures of from 30° C. to 120° C., an RPM of from 50 to 700, and output rates of from 13.5 to 2725 kg/hour from which the blend is extruded in the form of powder or strands. The powders or strands are then pelletized or formed into granules for injection molding and other thermal processes. Standard techniques and apparatuses well known in the art can be used for these processes. Starch as received has some water present. Optionally, water can be added during compounding. Often, some water is typically lost during the compounding step. The final water content of the compounded blend is in the range of from about 2 to about 40 weight percent, preferably from about 6 to about 30 weight percent and, most preferably, from about 8 to about 25 weight percent.

The compounded material can be fabricated into films using processes well known to those skilled in the art, such as by cast film extrusion, blown film extrusion, and can be incorporated in multilayer constructions such as coextruded cast or blown films, with or without intermediate adhesive layers or layers containing recycled scrap material from the fabrication process.

Although the invention is specifically described with respect to the preferred embodiment, that is, the process for preparing starch and hydroxy-functionalized polyetheramine compositions, the present process is also applicable to the preparation of mixtures of thermoplastic hydroxy-functionalized polyetheramines and polysaccharides other than starch, modified polysaccharides, naturally-occurring fibers or particulate fillers.

Polysaccharides other than starch which can be employed in the practice of the present invention for preparing the composition are the different celluloses, hemicelluloses, xylanes, gums, pectins and pullulans. Polysaccharides are known and are described, for example, in *Encyclopedia of Polymer Science and Engineering,* 2nd edition, Volume 13, pages 87–144.

The modified polysaccharides which can be employed in the practice of the present invention for preparing the composition are the esters and ethers of polysaccharides, such as, for example, cellulose ethers and cellulose esters, or starch esters and starch ethers. Modified polysaccharides are known and are described, for example, in *Encyclopedia of Polymer Science and Engineering,* 2nd edition, Volume 3, pages 226–263.

Celluloses are known and are described, for example, in *Encyclopedia of Polymer Science and Engineering,* 2nd edition, Volume 3, pages 226–263. Celluloses are natural carbohydrate high polymers (polysaccharides) consisting of anhydroglucose units joined by an oxygen linkage to form long molecular chains that are essentially linear. Cellulose can be hydrolyzed to form glucose. The degree of polymerization ranges from 1000 for wood pulp, to 3500 for cotton fiber, giving a molecular weight of from 160,000 to 560,000. Cellulose can be extracted from vegetable tissues (wood, grass, and cotton). Celluloses can be used in the form of fibers.

The naturally-occurring fibers or particulate fillers which can be employed in the practice of the present invention for preparing the composition are, for example, wood flour, wood pulp, wood fibers, cotton, flax, hemp, or ramie fibers, rice or wheat straw, chitin, chitosan, cellulose materials derived from agricultural products, nut shell flour, corn cob flour, and mixtures thereof.

The following working examples are given to illustrate the invention and should not be construed as limiting its scope. Unless otherwise indicated, all parts and percentages are by weight.

EXAMPLE 1

Native wheat starch and PHAE (made from D.E.R.™ 383, Trademark of The Dow Chemical Company, and monoethanolamine, with a $T_g$ of 75° C.) were fed via separate feeders into a Werner Pfleiderer 30 mm twin-screw extruder. The water of the incoming starch was measured. Sufficient water was pumped directly into the extruder at a rate to make the final water content of the mixture 18 weight percent. The feed rates were: starch 36.6 pounds/hour, PHAE 3.84 pounds/hour, water 2.85 pounds/hour. The screw rpm was 185, die pressure was 850 psi, the extruder zone temperatures were 40° C., 69° C., 82° C., 84° C., and 82° C. for zones 1 through 4 and the four-strand die, respectively. The extruder employed in this example was divided into four lengthwise zones of substantially equal lengths comprising Zone 1, Zone 2, Zone 3 and Zone 4. Zone 1 through most of Zone 2 are single-flighted conveying elements. At the end of Zone 2, there is one diameter of kneading block (the length is equal to the diameter of the extruder). In Zone 3, there are two diameters of conveying elements (length is twice the diameter of the extruder), followed by one diameter of kneading blocks. The remainder of the screw is all single-flighted conveying elements. The strand was chopped into pellets. Unmixed pellets of PHAE could be observed in the strand (the PHAE pellets were dyed red in order to observe the state of dispersion). The compounded pellets containing the starch and PHAE were suitable for subsequent thermoplastics processing.

EXAMPLE 2

The procedure of Example 1 was followed except that PHAE was made from, monoethanolamine, and a blend of 50 weight percent D.E.R. 383 and 50 weight percent resorcinol DGE and a $T_g$ of 55° C., was used. The PHAE was also dyed, blue in this case, and showed a higher degree of dispersion upon compounding than Example 1. The extrudate was light blue in color with a few darker blue areas.

EXAMPLE 3

Native wheat starch, 92.5 weight percent, PHAE 7 percent (made from D.E.R.™ 383, Trademark of The Dow Chemical Company, and monoethanolamine, with a $T_g$ of 75° C.) and talc, 0.5 percent were fed into a Wenger TX-57 twin-screw extruder, L/D 25 to 1, vent port at $3_{rd}$ head with 9 mm Hg vacuum, screw speed 336. Screw configuration: short (less than a diameter) mixing elements just prior to the vent, the rest of the screw is conveying elements. Head set point temperatures: 45, 100, 100, 85, 80 for heads 1 to 5 respectively. The die had 30 holes of 3.5 mm in diameter. The solids flow rate was 155 kg/hour. Both water and steam were added using a preconditioner at the rates of 40 kg/hour for the water and 3 kg/hour for the steam. The pellets were face-cut at the die and run through a dryer at ambient temperature in order to cool the pellets with agitation to avoid agglomeration. The resulting pellets were suitable for further processing into foam, film, molded articles etc. These pellets were made into loose fill packaging material (foam peanuts) using a short single-screw extruder. The extruder was a Maddox 650 with a 16 inch long screw. The first three screw flights were single-flighted with a 1 inch pitch. The remaining part of the screw was double-flighted with a pitch of 0.5 inches. The screw flights themselves were ⅛ inch wide. Two flow plates were used. The first had 54 holes 5/32 inch in diameter around the outside edge of the plate. The second had 55 holes ⅛ inch in diameter, evenly spaced throughout the plate. The die consisted of a single opening 0.095 inches with a land length of 1/16 inch. The RPM was 145. The resulting foam peanuts were suitable for loose fill packaging applications.

What is claimed is:

1. A process for preparing a starch-based thermoplastic hydroxy-functionalized polyetheramine comprising continuously feeding from about 40 to about 98 weight percent starch and from about 2 to about 60 weight percent of a thermoplastic hydroxy-functionalized polyetheramine into a mixing screw extruder at a temperature of from about 30° C. to about 120° C. while maintaining a water content in the extruder of from about 7 to about 50 percent, continuously removing the compounded mixture from the extruder in the form of strands at a rate of from 13.5 to 2725 kg/hour, and forming the strands of compounded mixture into pellets.

2. The process of claim 1 wherein the mixing screw extruder is a single-screw extruder, or a twin-screw extruder.

3. The process of claim 1 wherein the thermoplastic hydroxy-functionalized polyetheramine has repeating units represented by the formula:

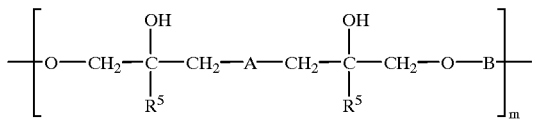

wherein A is an amine moiety or a combination of different amine moieties; B is a divalent organic moiety which is predominantly hydrocarbylene; $R^5$ is alkyl or hydrogen; and m is an integer from 10 to 1000.

4. The process of claim 1, wherein the starch is derived from grains.

5. The process of claim 4, wherein the starch is a granular starch.

6. The process of claim 5, wherein the starch is a thermoplastic starch.

7. The process of claim 1 wherein the thermoplastic hydroxy-functionalized polyetheramine has repeating units represented by the formula:

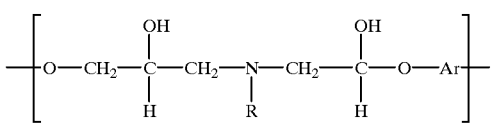

wherein R is 2-hydroxyethyl, phenyl, methyl, ethyl, propyl, 2-hydroxypropyl, 3-hydroxypropyl, cyclohexyl, butyl, aryl, hexyl or combination thereof; and Ar is isopropylidene, diphenylene, oxydiphenylene, sulfonyldiphenylene, methylene diphenylene, 1,4-phenylene, 1,3-phenylene or combination thereof.

8. The process of claim 1 which further comprises forming the pellets into loose fill packaging foams using a single-screw or a twin-screw extruder.

9. The process of claim 1 which further comprises forming the pellets into molded articles, foam or film laminates.

10. A process for preparing a compounded mixture of a thermoplastic hydroxy-functionalized polyetheramine and polysaccharides other than starch, modified polysaccharides, naturally-occurring fibers or particulate fillers comprising continuously feeding from about 40 to about 98 weight percent of the polysaccharides other than starch, modified polysaccharides, naturally-occurring fibers or particulate fillers and from about 2 to about 60 weight percent of a thermoplastic hydroxy-functionalized polyetheramine into a mixing screw extruder at a temperature of from about 30° C. to about 120° C. while maintaining a water content in the extruder of from about 7 to about 50 weight percent, continuously removing the compounded mixture from the extruder in the form of strands at a rate of from 13.5 to 2725 kg/hour, and forming the strands of compounded mixture into pellets.

* * * * *